US008826654B2

(12) United States Patent
Nelson et al.

(10) Patent No.: US 8,826,654 B2
(45) Date of Patent: Sep. 9, 2014

(54) HYDRAULIC FLUID SYSTEM

(75) Inventors: Bryan E. Nelson, Lacon, IL (US); Jeremy T. Peterson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 634 days.

(21) Appl. No.: 13/149,161

(22) Filed: May 31, 2011

(65) Prior Publication Data

US 2012/0304631 A1    Dec. 6, 2012

(51) Int. Cl.
*F16D 31/02*    (2006.01)

(52) U.S. Cl.
USPC .............................................. 60/413; 60/416

(58) Field of Classification Search
USPC ............................ 60/413, 416, 484, 456, 464
See application file for complete search history.

(56) References Cited

U.S. PATENT DOCUMENTS

| | | | |
|---|---|---|---|
| 3,570,519 A | | 3/1971 | Bianchetta |
| 4,100,739 A | * | 7/1978 | Shaffer ........................... 60/413 |
| 4,388,987 A | * | 6/1983 | Hennessey et al. .......... 192/3.26 |
| 4,414,809 A | | 11/1983 | Burris |
| 4,891,941 A | * | 1/1990 | Heintz ............................ 60/416 |
| 5,531,190 A | | 7/1996 | Mork |
| 5,960,628 A | | 10/1999 | Machesney et al. |
| 5,975,233 A | | 11/1999 | Eisenbacher |
| 6,076,488 A | | 6/2000 | Yamagishi |
| 6,273,034 B1 | | 8/2001 | Hawkins et al. |
| 6,279,317 B1 | * | 8/2001 | Morgan .......................... 60/413 |
| 6,648,115 B2 | | 11/2003 | Smith et al. |
| 6,848,255 B2 | * | 2/2005 | Chiaramonte .................. 60/456 |
| 7,155,907 B2 | | 1/2007 | Desjardins et al. |
| 7,273,122 B2 | | 9/2007 | Rose |
| 7,360,357 B2 | | 4/2008 | Zahniser |
| 7,444,809 B2 | | 11/2008 | Smith et al. |
| 7,658,065 B2 | | 2/2010 | Smith et al. |
| 2005/0196288 A1 | | 9/2005 | Cherney |
| 2007/0006824 A1 | | 1/2007 | Saotome |
| 2008/0108032 A1 | | 5/2008 | Tuhy et al. |

(Continued)

FOREIGN PATENT DOCUMENTS

| | | | |
|---|---|---|---|
| DE | 195 31 413 | 2/1997 | |
| DE | 19531413 A1 * | 2/1997 | ............... B62D 5/07 |

(Continued)

OTHER PUBLICATIONS http://www.eaton.com/EatonCom/ProductsServices/Hybrid/SystemsOverview/HybridElectric/index.htm printed on Nov. 30, 2010.

(Continued)

*Primary Examiner* — Edward Look
*Assistant Examiner* — Daniel Collins
(74) *Attorney, Agent, or Firm* — Finnegan, Henderson, Farabow, Garrett & Dunner LLP

(57) ABSTRACT

A hydraulic fluid system for a mobile machine includes a closed loop hydraulic fan circuit. The hydraulic fan circuit includes a primary pump, a motor fluidly connected to the primary pump, and a fan driven by the motor. The hydraulic fan circuit also includes a supply passage extending from the primary pump to the motor, a return passage extending from the motor to the primary pump, and a first accumulator selectively fluidly connected to at least one of the supply and return passages via a charge valve. The hydraulic fluid system also includes at least one open loop hydraulic circuit fluidly connected to the first accumulator.

18 Claims, 3 Drawing Sheets

(56) References Cited

U.S. PATENT DOCUMENTS

| | | | |
|---|---|---|---|
| 2008/0134674 A1* | 6/2008 | Geissler et al. | 60/464 |
| 2008/0207398 A1 | 8/2008 | Dvorak et al. | |
| 2008/0238607 A1 | 10/2008 | Schuricht et al. | |
| 2008/0250781 A1 | 10/2008 | Mueller et al. | |
| 2008/0295507 A1* | 12/2008 | Mueller et al. | 60/414 |
| 2009/0084102 A1 | 4/2009 | Mueller et al. | |
| 2009/0100830 A1 | 4/2009 | Schneider et al. | |
| 2009/0164084 A1 | 6/2009 | Hawkins et al. | |
| 2010/0236232 A1 | 9/2010 | Boehm et al. | |

FOREIGN PATENT DOCUMENTS

| | | |
|---|---|---|
| EP | 1963687 | 9/2008 |
| EP | 1967745 | 9/2008 |
| EP | 2050970 | 4/2009 |
| EP | 2270339 | 1/2011 |
| WO | WO 2006/038968 | 4/2006 |
| WO | WO 2006/055978 | 5/2006 |

OTHER PUBLICATIONS http://www.eaton.com/EatonCom/ProductsServices/Hybrid/SystemsOverview/HydraulicHLA/index.htm printed on Nov. 30, 2010.

http://www.eaton.com/EatonCom/ProductsServices/Hybrid/SystemsOverview/SeriesHydraulic/indm printed on Nov. 30, 2010.

* cited by examiner

HYDRAULIC FLUID SYSTEM

TECHNICAL FIELD

The present disclosure relates generally to a hydraulic fluid system for a mobile machine, and more particularly, to a hydraulic fan circuit of a mobile machine.

BACKGROUND

Engine-driven machines such as, for example, dozers, loaders, excavators, motor graders, and other types of heavy equipment typically include a cooling system that cools the associated engine and other machine components below a threshold that provides for longevity of the machines. The cooling system typically consists of one or more air-to-air or liquid-to-air heat exchangers that reduce a temperature of the coolant circulated throughout the engine or combustion air directed into the engine. Heat from the coolant or combustion air is passed to air from a fan that is speed-controlled based on a temperature of the engine and/or associated hydraulic system.

The cooling system fan is generally hydraulically powered. That is, a pump driven by the engine draws in low-pressure fluid and discharges the fluid at elevated pressures to a motor that is connected to the fan. The pump and the motor are generally connected in a closed loop configuration in which the pressurized fluid used to drive the motor is returned to the pump. When a temperature of the engine is higher than desired, the pump and motor work together to increase the speed of the fan. When the temperature of the engine is low, the pump and motor work together to decrease the speed of the fan and, in some situations, even stop the fan altogether. Under some conditions, the fan rotation can be reversed such that airflow through the heat exchanger is also reversed to help dislodge debris that has collected in the heat exchanger.

Although effective at cooling the engine and reducing engine speed, it has been found that the hydraulic circuit driving the cooling fan described above may have excess capacity at times that is not utilized. With increasing focus on the environment, particularly on machine fuel consumption, it has become increasingly important to fully utilize all resources. As a result, some machines attempt to utilize the excess capacity of the hydraulic fan circuit to power other fluid circuits associated with the machine. Such circuits may include open loop hydraulic circuits, such as braking systems and/or steering systems of the machine.

One such system is described in U.S. Pat. No. 7,360,357 to Zahniser, issued on Apr. 22, 2008 ("the '357 patent"). Specifically, the '357 patent describes a hydraulic system including primary and secondary fixed displacement pumps. The primary pump is configured to direct hydraulic fluid to a power steering circuit of a vehicle, and the secondary pump is configured to direct fluid to a fan motor used to drive a cooling fan. The secondary pump is fluidly connected to the fan motor in a closed loop configuration.

Although the hydraulic system of the '357 patent may be capable of operating both a fan motor and a power steering circuit associated with the vehicle, the disclosed system may increase the cost of the vehicle and may not be as durable as other known systems. That is, the system of the '357 utilizes separate pumps to operate the fan and steering circuits. The use of such duplicate components adds cost and complexity to the system. In addition, the fixed displacement pumps used in the system of the '357 patent may undergo rapid acceleration and/or deceleration at start-up, shut-down, and/or during a reversal of fan direction. Such rapid changes in pump operation may result in pressure spikes that, over time, may damage the pumps and/or other components of the hydraulic system.

The disclosed hydraulic fan circuit is directed to overcoming one or more of the problems set forth above and/or other problems of the prior art.

SUMMARY

In an exemplary embodiment of the present disclosure a hydraulic fluid system for a mobile machine includes a closed loop hydraulic fan circuit. The hydraulic fan circuit includes a primary pump, a motor fluidly connected to the primary pump, and a fan driven by the motor. The hydraulic fan circuit also includes a supply passage extending from the primary pump to the motor, a return passage extending from the motor to the primary pump, and a first accumulator selectively fluidly connected to at least one of the supply and return passages via a charge valve. The hydraulic fluid system also includes at least one open loop hydraulic circuit fluidly connected to the first accumulator.

In another exemplary embodiment of the present disclosure a hydraulic fluid system for a mobile machine includes a closed loop hydraulic fan circuit. The hydraulic fan circuit includes a primary pump, a motor fluidly connected to the primary pump, and a fan driven by the motor. The hydraulic fan circuit also includes a supply passage extending from the primary pump to the motor, a return passage extending from the motor to the primary pump, and a first accumulator selectively fluidly connected to at least one of the supply and return passages via a charge valve. The hydraulic fan circuit further includes a second accumulator fluidly connected to at least one of the supply and return passages. The second accumulator is configured to assist in providing a flow of makeup fluid to the primary pump while the charge valve directs fluid to the first accumulator. The hydraulic fluid system also includes an open loop hydraulic circuit fluidly connected to the first accumulator. The first accumulator is configured to supply a pressurized flow of fluid to the open loop hydraulic circuit In yet another exemplary embodiment of the present disclosure, a method of supplying fluid to an open loop hydraulic circuit of a mobile machine includes directing fluid from a first accumulator of a closed loop hydraulic fan circuit of the mobile machine to the open loop circuit. The closed loop hydraulic fan circuit includes a motor, a fan driven by the motor, a primary pump fluidly connected to the motor, and a second accumulator fluidly connected to the fan. The method also includes directing fluid from the closed loop hydraulic fan circuit to the first accumulator in response to the first accumulator reaching a minimum threshold pressure. The method also includes directing fluid from the second accumulator to the motor and/or the pump while directing the fluid to the first accumulator, and providing a flow of makeup fluid to the primary pump using fluid received from the second accumulator.

DETAILED DESCRIPTION

Figure 1:
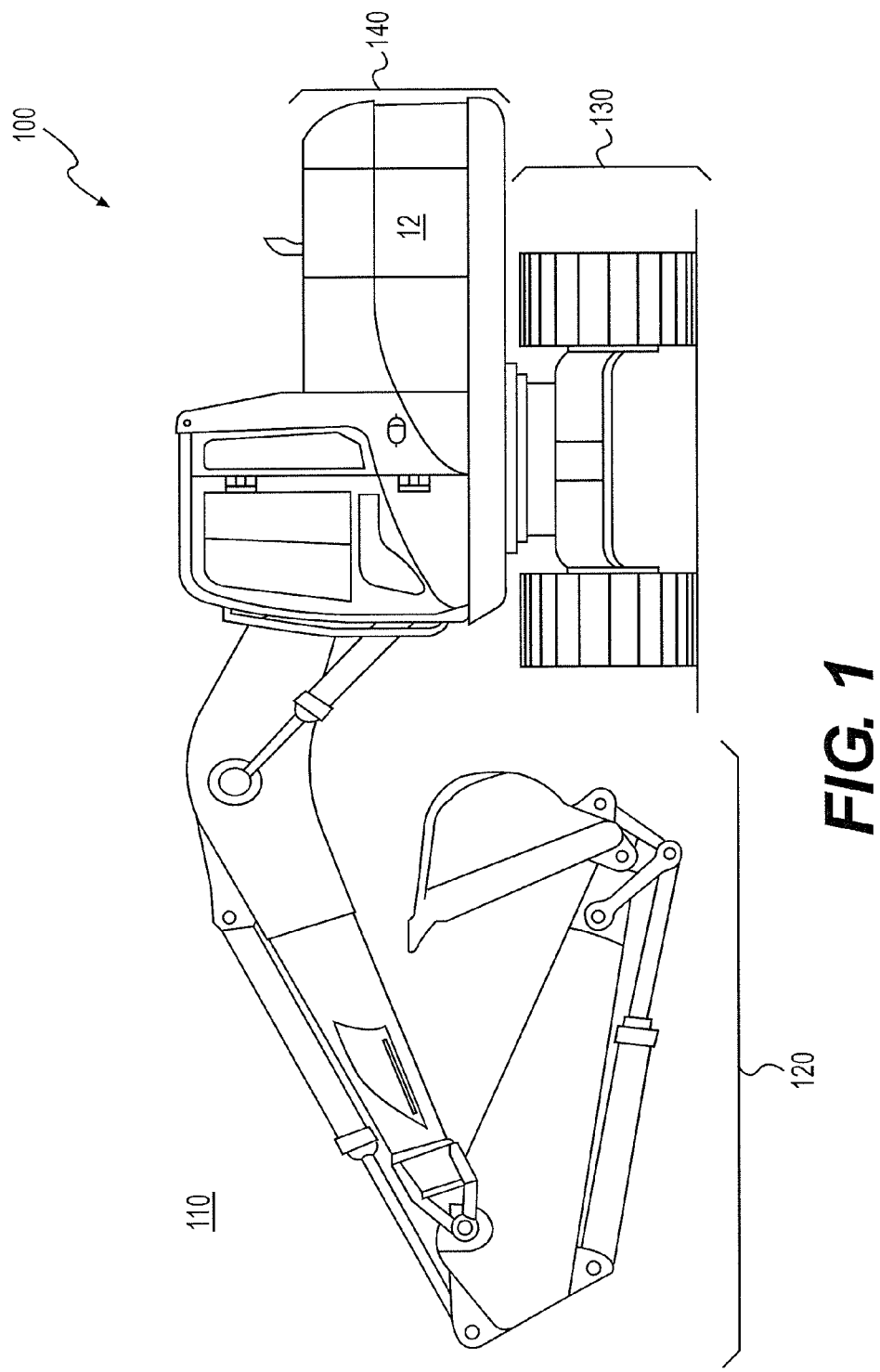
FIG. 1 is a pictorial illustration of an exemplary machine.

FIG. 1 illustrates an exemplary machine 100 performing a particular function at a worksite 110. Machine 100 may embody a stationary or mobile machine. For example, machine 100 may be an earth moving machine such as the excavator depicted in FIG. 1, in which the particular function being performed includes the removal of earthen material from worksite 110 that alters the geography of worksite 110 to a desired form. Machine 100 may alternatively embody a different earth moving machine such as a motor grader or a wheel loader, or a non-earth moving machine such as a passenger vehicle, a stationary generator set, or a pumping mechanism. Machine 100 may embody any suitable operation-performing machine.

Machine 100 may be equipped with multiple systems that facilitate the operation of machine 100 at worksite 110, for example a tool system 120, a drive system 130, and an engine system 140 that provides power to tool system 120 and drive system 130. One or more of such systems may include open loop hydraulic circuits that receive a flow of pressurized fluid from the engine system 140. For example, as will be described in greater detail below with respect to FIGS. 2 and 3, the drive system 130 may comprise one or more open loop hydraulic circuits 74, such as a brake system and a steering system associated with the machine 100. Such open loop hydraulic circuits 74 may be fluidly connected to one or more components of a closed loop hydraulic circuit of the machine 100, such as a closed loop hydraulic fan circuit 10. Thus, in exemplary embodiments of the present disclosure, a hydraulic fluid system 150 for the mobile machine 100 may include, among other things, the closed loop hydraulic fan circuit 10 and one or more of the open loop hydraulic circuits 74. During the performance of most tasks, power from engine system 140 may be disproportionately split between tool system 120 and drive system 130. That is, machine 100 may generally be either traveling between excavation sites and primarily supplying power to drive system 130, or parked at an excavation site and actively moving material by primarily supplying power to tool system 120. Machine 100 generally will not be traveling at high speeds and actively moving large loads of material with tool system 120 at the same time. Accordingly, engine system 140 may be sized to provide enough power to satisfy a maximum demand of either tool system 120 or of drive system 130, but not both at the same time. Although sufficient for most situations, there may be times when the total power demand from machine systems (e.g., from tool system 120 and/or drive system 130) exceeds a power supply capacity of engine system 140. Engine system 140 may be configured to recover stored energy during these times to temporarily increase its supply capacity. This additional supply capacity may also or alternatively be used to reduce a fuel consumption of engine system 140 by allowing for selective reductions in the power production of engine system 140, if desired.

Figure 2:
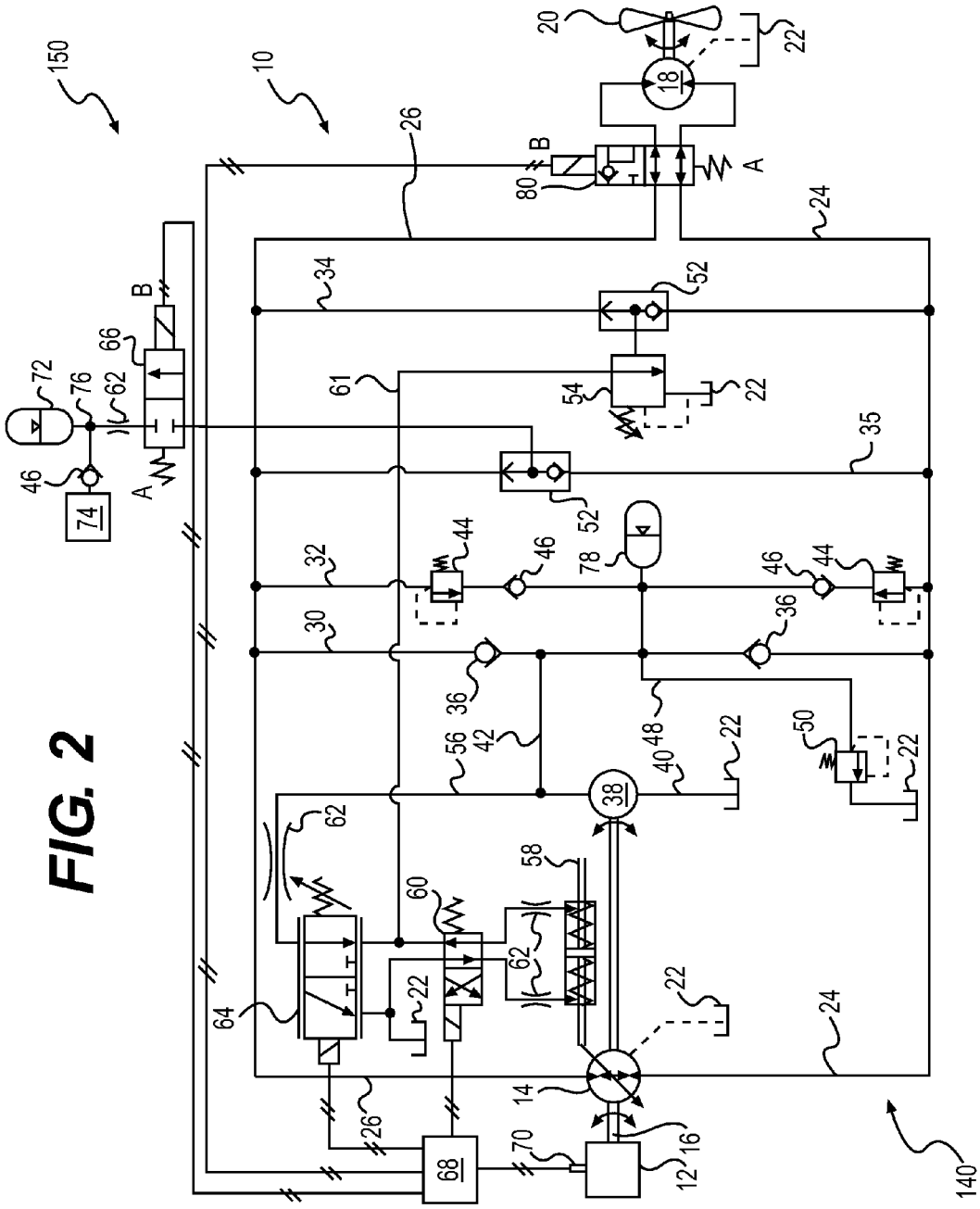
FIG. 2 is a schematic illustration of an exemplary hydraulic fluid system that may be used with the machine of FIG. 1.

As illustrated in FIG. 2, engine system 140 may include an engine 12 equipped with the hydraulic fan circuit 10 mentioned above. The engine 12 may embody an internal combustion engine, for example a diesel, gasoline, or gaseous fuel-powered engine. Hydraulic fan circuit 10 may include a collection of components that are powered by engine 12 to cool engine 12. Specifically, hydraulic fan circuit 10 may include a primary pump 14 connected directly to a mechanical output 16 of engine 12, a motor 18 fluidly connected to primary pump 14 in a closed loop configuration, and a fan 20 connected to motor 18. As used herein, the term "closed loop" is indicative of a hydraulic circuit in which fluid used to drive a component is supplied to the driven component by a drive component (such as a pump), and is returned to the drive component. As used herein, the term "open loop" is indicative of a hydraulic circuit in which fluid used to drive a component is supplied to the driven component by a drive component and is not returned to the drive component. Engine 12 may drive primary pump 14 via mechanical output 16 to draw in low-pressure fluid and discharge the fluid at an elevated pressure. Motor 18 may receive and convert the pressurized fluid to mechanical power that drives fan 20 to generate a flow of air. The flow of air may be used to cool engine 12 directly and/or indirectly by way of a heat exchanger (not shown).

Primary pump 14 may be an over-center, variable-displacement or variable-delivery pump driven by engine 12 to pressurize fluid. For example, primary pump 14 may embody a rotary or piston-driven pump having a crankshaft (not shown) connected to engine 12 via mechanical output 16 such that an output rotation of engine 12 results in a corresponding pumping motion of primary pump 14. The pumping motion of primary pump 14 may function to draw in low-pressure fluid from motor 18 via a return passage 24, and discharge the fluid at an elevated pressure to motor 18 via a supply passage 26. Primary pump 14 may be dedicated to supplying pressurized fluid to motor 18 via supply passage 26 or, alternatively, may also supply pressurized fluid to other hydraulic circuits associated with engine 12 or machine 100, if desired. Such circuits may be open loop and/or closed loop circuits of the machine 100, and exemplary open loop hydraulic circuits 74 may comprise brake systems and/or steering systems of the machine 100. Similarly, primary pump 14 may be dedicated to drawing low-pressure fluid from motor 18 via return passage 24 or, alternatively, may also draw in low-pressure fluid from other hydraulic circuits associated with engine 12 or machine 100, if desired. It should be noted that, in some situations, primary pump 14 and motor 18 may be operated in a reverse flow direction and, in these situations, the fluid pressures and/or flow directions within return and supply passages 24, 26 may be reversed.

Motor 18 may be a fixed or variable displacement rotary- or piston-type hydraulic motor movable by an imbalance of pressure acting on a driven element (not shown), for example an impeller or a piston. Fluid pressurized by primary pump 14 may be directed into motor 18 via supply passage 26 and drained from motor 18 via return passage 24. The direction of pressurized fluid to one side of the driven element and the draining of fluid from an opposing side of the driven element may create a pressure differential across the driven element that causes the driven element to move or rotate. The direction and rate of fluid flow through motor 18 may determine the rotational direction and speed of motor 18 and fan 20, while the pressure imbalance of the fluid may determine the torque output.

Fan 20 may be disposed proximate an air-to-air or liquid-to-air heat exchanger (not shown) and configured to produce a flow of air directed through channels of the exchanger for heat transfer with coolant or combustion air therein. In addition to the fan 20 and other components discussed herein, the hydraulic fan circuit (and/or other cooling circuits associated with the engine 12) may include hydraulic fluid coolers, air conditioners, fuel coolers, and/or other like devices. Fan 20 may include a plurality of blades connected to motor 18 and be driven by motor 18 at a speed corresponding to a desired flow rate of air and/or a desired engine coolant temperature. In one embodiment, a flywheel (not shown) may be connected to one of fan 20 and motor 18 to rotate therewith. In another embodiment, the flywheel may be incorporated into fan 20 (i.e., fan 20 may be oversized), if desired.

Return and supply passages 24, 26 may be interconnected via multiple different crossover passages. In the exemplary embodiments shown in FIGS. 2 and 3, four different crossover passages interconnect return and supply passages 24 and 26, including a makeup passage 30, a relief passage 32, a pressure limiting passage 34, and a charge passage 35. Makeup passage 30 may provide makeup fluid to return and/or supply passages 24, 26 to help ensure that hydraulic fan circuit 10 remains full of fluid. Relief passage 32 may provide a leak path for high-pressure fluid within return and/or supply passages 24, 26 such that damage to the components of hydraulic fan circuit 10 caused by excessive pressures may be avoided. Pressure limiting passage 34 may provide for pilot pressure control of a displacement of primary pump 14. Charge passage 35 may provide fluid to a first and/or second accumulator 72, 78 of the hydraulic fan circuit 10.

One or more makeup valves 36, for example check valves, may be located within makeup passage 30 to selectively connect the output from a charge pump 38 with return and/or supply passages 24, 26 based on pressures of fluid in the different passages. That is, when a pressure within return and/or supply passage 24, 26 falls below a pressure of fluid discharged by charge pump 38, makeup valve(s) 36 may open and allow fluid to pass from charge pump 38 into the respective passage(s). Charge pump 38 may be driven by engine 12 to rotate with primary pump 14 and draw in fluid from a low-pressure sump 22 via a tank passage 40 and discharge the fluid into makeup passage 30 via a valve passage 42. In additional exemplary embodiments, the charge pump 38 may be driven by one or more additional power sources such as, for example, an electric motor associated with the machine 100.

One or more relief valves 44 and/or check valves 46 may be located within relief passage 32. Relief valves 44 may be spring-biased and movable in response to a pressure of return and/or supply passages 24, 26 to selectively connect the respective passages with a low-pressure passage 48, thereby relieving excessive fluid pressures within return and supply passages 24, 26. An additional spring-biased pressure relief valve 50 may be located within return passage 48 and selectively moved by a pressure within low-pressure passage 48 between flow-passing and flow-blocking (shown in FIG. 2) positions to limit a maximum pressure within low-pressure passage 48. Check valves 46 may help ensure unidirectional flows of fluid into low-pressure passage 48 from return and supply passages 24, 26.

A resolver 52 may be disposed within and/or otherwise fluidly connected to pressure limiting passage 34 and associated with a pilot pressure limiter 54. An additional resolver 52 may be disposed within and/or otherwise fluidly connected to the charge passage 35 and associated with a charge valve 66. The resolvers 52 may be any type of valve or known flow limiting device configured to connect fluid from the one of return and supply passages 24, 26 having the greater pressure with pilot pressure limiter 54 or charge valve 66, respectively. In most instances, the resolver 52 of the pressure limiting passage 34 connects the pressure from supply passage 26 with pilot pressure limiter 54, and the resolver 52 of the charge passage 35 connects the pressure from supply passage 26 with the charge valve 66. However, when primary pump 14 and motor 18 are operating in a reverse flow direction or during an overrunning condition of motor 18, it may be possible for the pressure within return passage 24 to exceed the pressure within supply passage 26. Under these conditions, the respective resolvers 52 may connect the pressure from return passage 24 with pilot pressure limiter 54 and charge valve 66. When the pressure of fluid passing through resolver 52 of the pressure limiting passage 34 exceeds a threshold limit, pilot pressure limiter 54 may move from a flow-blocking position toward a flow-passing position. It is contemplated that the threshold limit of pilot pressure limiter 54 may be tunable, if desired, such that a responsiveness or performance of hydraulic fan circuit 10 may be adjusted.

Similarly, when pressure within the accumulator 72 reaches a minimum threshold pressure, the charge valve 66 may move from a flow-blocking position (shown in FIG. 2) toward a flow-passing position. The charge valve 66 may permit passage of fluid from the resolver 52 of the charge passage 35 to the accumulator 72, in the flow-passing position, until the pressure within the accumulator 72 reaches a desired pressure above the minimum threshold pressure. The charge valve 66 illustrated in FIG. 2 may be biased toward the flow-blocking position, fluidly disconnecting the accumulator 72 from the resolver 52. The charge valve 66 may comprise any type of controllable pressure limiting valve known in the art. For example, the charge valve 66 may comprise a one-way, two position valve; a two-way, two position valve; a four-way, three position valve; and/or any other like valve type. The charge valve 66 may be a spring-biased, solenoid-actuated control valve that is moveable in response to a command from a controller 68.

Pilot pressure limiter 54 may be in fluid communication with a pilot passage 56 that extends between charge pump 38 and a displacement actuator 58 of primary pump 14. Specifically, pilot pressure limiter 54 may be connected to pilot passage 56 via a passage 61. The pilot pressure limiter 54 may comprise any type of controllable pressure limiting valve known in the art. When pilot pressure limiter 54 is controlled to move toward the flow-passing position described above, pilot fluid from within pilot passage 56 may be allowed to drain to low-pressure sump 22. The draining of pilot fluid from pilot passage 56 may reduce a pressure of fluid within pilot passage 56, and may reduce the pressure of the pilot fluid sent to and/or otherwise acting on an actuator piston of the primary pump 14. Pilot passage 56 may also communicate with low-pressure sump 22 via valve passage 42, low pressure passage 48, and pressure relief valve 50 for similar purposes. It is contemplated that the opening pressure of pilot pressure limiter 54 may be the same or different than the opening pressure of pressure relief valve 50, as desired. In an exemplary embodiment, the pilot pressure limiter 54 may limit the pressure of the pilot fluid once a predetermined pressure, such as a maximum hydraulic fan circuit pressure, has been reached. In such an embodiment, the pilot pressure limiter 54 may prevent the speed of the fan 20 from exceeding a maximum cooling speed. To increase the speed of the fan 20 (and the pressure of the pilot fluid within the hydraulic fan circuit 10) beyond the maximum cooling speed, the pilot pressure limiter 54 may be recalibrated for a higher variable pressure setting or, alternatively, the pilot pressure limiter 54 may be bypassed or overridden. In exemplary embodiments, the pilot pressure limiter 54 may be configured to ensure that the pressure of the pilot fluid, and the corresponding speed of the fan 20, may not exceed respective maximum values in the event of an unexpected malfunction of one or more pressure control valves or other pressure control components of the hydraulic fan circuit 10.

The pilot fluid in pilot passage 56 may be selectively communicated with displacement actuator 58 to affect a displacement change of primary pump 14. Displacement actuator 58 may embody a double-acting, spring-biased cylinder connected to move a swashplate, a spill valve, or another displacement-adjusting mechanism of primary pump 14. When pilot fluid of a sufficient pressure is introduced into one end of displacement actuator 58, displacement actuator 58 may move the displacement-adjusting mechanism of primary pump 14 by an amount corresponding to the pressure of the fluid.

A directional control valve 60 may be associated with displacement actuator 58 to control what end of displacement actuator 58 receives the pressurized pilot fluid and, accordingly, in which direction (i.e., which of a displacement-increasing and a displacement-decreasing direction) the displacement-adjusting mechanism of primary pump 14 is moved by displacement actuator 58. Directional control valve 60 may be a spring-biased, solenoid-actuated control valve that is movable based on a command from the controller 68. Directional control valve 60 may move between a first position at which a first end of displacement actuator 58 receives pressurized pilot fluid, and a second position at which a second opposing end of displacement actuator 58 receives pressurized pilot fluid. When the first end of displacement actuator 58 is receiving pressurized pilot fluid (i.e., when directional control valve 60 is in the first position), the second end of displacement actuator 58 is simultaneously connected to low-pressure sump 22 via directional control valve 60. Similarly, when the second end of displacement actuator 58 is receiving pressurized pilot fluid (i.e., when directional control valve 60 is in the second position), the first end of displacement actuator 58 is simultaneously connected to low-pressure sump 22 via directional control valve 60. A restrictive orifice 62 may be associated with the ends of displacement actuator 58 and/or with pilot passage 56 to help reduce pressure fluctuations in the entering and exiting flows of pilot fluid and thereby stabilize fluctuations in a speed of pump displacement changes. Such restrictive orifices 62 may also be associated with the charge valve 66 and/or accumulators 72, 78 for reducing pressure drop in the fan hydraulic circuit 10. Such restrictive orifices 62 may limit passage of fluid to the respective accumulator 72, 78, and may prevent the primary pump 14 from being unduly overwhelmed by demand when, for example, the charge valve 66 is moved to the flow-passing position.

A pressure control valve 64 may also be associated with pilot passage 56 and displacement actuator 58, and configured to control movement of displacement actuator 58 by varying a pressure of pilot passage 56. Pressure control valve 64 may be movable from a first (open) position (shown in FIG. 2) at which all pilot fluid from charge pump 38 is passed through directional control valve 60 to displacement actuator 58, toward a second (closed) position at which a portion or all of the pilot fluid is drained to low-pressure sump 22 before reaching displacement actuator 58. Pressure control valve 64 may be movable from the first position toward the second position based on a command from controller 68. It is contemplated that pressure control valve 64 may be directly controlled via a solenoid (shown in FIG. 2) or, alternatively, pilot operated via a separate solenoid valve (not shown), as desired. By selectively moving pressure control valve 64 between the first and second positions, a pressure of the pilot fluid in communication with displacement actuator 58 and, hence, a displacement of primary pump 14 and a corresponding speed of the fan 20 may be controlled. In an exemplary embodiment, the pressure control valve 64 may be biased toward the first (open) position by any spring, magnetic, and/or other known biasing means.

Accumulators 72, 78 may comprise any fluid storage structures known in the art. Such accumulators 72, 78 may be configured to store hydraulic fluid utilized by the open loop and/or closed loop fluid circuits described herein. In exemplary embodiments, such accumulators 72, 78 may be configured to store and/or maintain fluids under pressure. For example, the accumulators 72, 78 may be configured to maintain fluids stored therein at or above a predetermined fluid pressure threshold. Accumulators 72, 78 may have similar fluid pressure thresholds and/or fluid capacities. Alternatively, in an exemplary embodiment, the first accumulator 72 may have a higher fluid pressure threshold and/or capacity than the second accumulator 78. In such an exemplary embodiment, the first accumulator 72 may comprise any high-pressure accumulator known in the art, while the second accumulator 78 may comprise any low-pressure accumulator known in the art. Such accumulators 72, 78 may be configured to supply a pressurized flow of fluid to components of the hydraulic fan circuit 10 and/or to components of other open and/or closed loop circuits fluidly connected thereto. For example, as shown in FIG. 2, the first accumulator 72 may be fluidly connected to one or more open loop hydraulic circuits 74.

The first accumulator 72 may be configured to provide pressurized fluid to such open loop hydraulic circuits 74 via one or more fluid junctions 76. Such junctions 76 may fluidly connect such open loop hydraulic circuits 74 to the closed loop hydraulic fan circuit 10 and/or components thereof. Such junctions 76 may comprise, for example, a portion of one or more of the makeup passage 30, relief passage 32, pressure limiting passage 34, charge passage 35, supply passage 26, return passage 24, and/or other fluid passages of the hydraulic fan circuit 10. In an exemplary embodiment, fluid flow through the junction 76 may be controlled by one or more valves of the type described herein. In additional exemplary embodiments, one or more check valves 46 may also be disposed between the junction 76 and the open loop hydraulic circuit 74. Such check valves 46 may prohibit, for example, fluid flowing from the open loop hydraulic circuit 74 into the closed loop hydraulic fan circuit 10

The hydraulic fan circuit 10 may also include a recirculation valve 80 fluidly connected proximate the motor 18. The recirculation valve 80 may comprise any type of controllable two-position valve known in the art. For example, the recirculation valve 80 may be biased toward a flow-passing position fluidly connecting the motor 18 to the supply and return passages 26, 24. Such a position is illustrated as position A in FIG. 2. The recirculation valve 80 may be biased toward such a flow-passing position by a spring, magnetic, and/or other known biasing means, and may be moved to a flow-blocking position (illustrated as position B in FIG. 2) in response to a command from controller 68. In such a flow-blocking position, the recirculation valve 80 may fluidly disconnect the motor 18 from the supply and return passages 26, 24, thereby forming a closed loop fluid circuit at the motor 18. Transitioning the recirculation valve 80 to the flow-blocking position (position B) may substantially reduce the parasitic load on the engine 12. In particular, forming a closed loop circuit with the recirculation valve 80 may reduce the load placed on the engine 12 by the primary pump 14, thereby enabling the engine 12 to provide increased power to other parasitic loads and/or systems connected to the engine 12. Such functionality may be useful, for example, during operations in which increased and/or peak power may be required from the engine 12 in order to perform a work function and/or other desired task.

Figure 3:
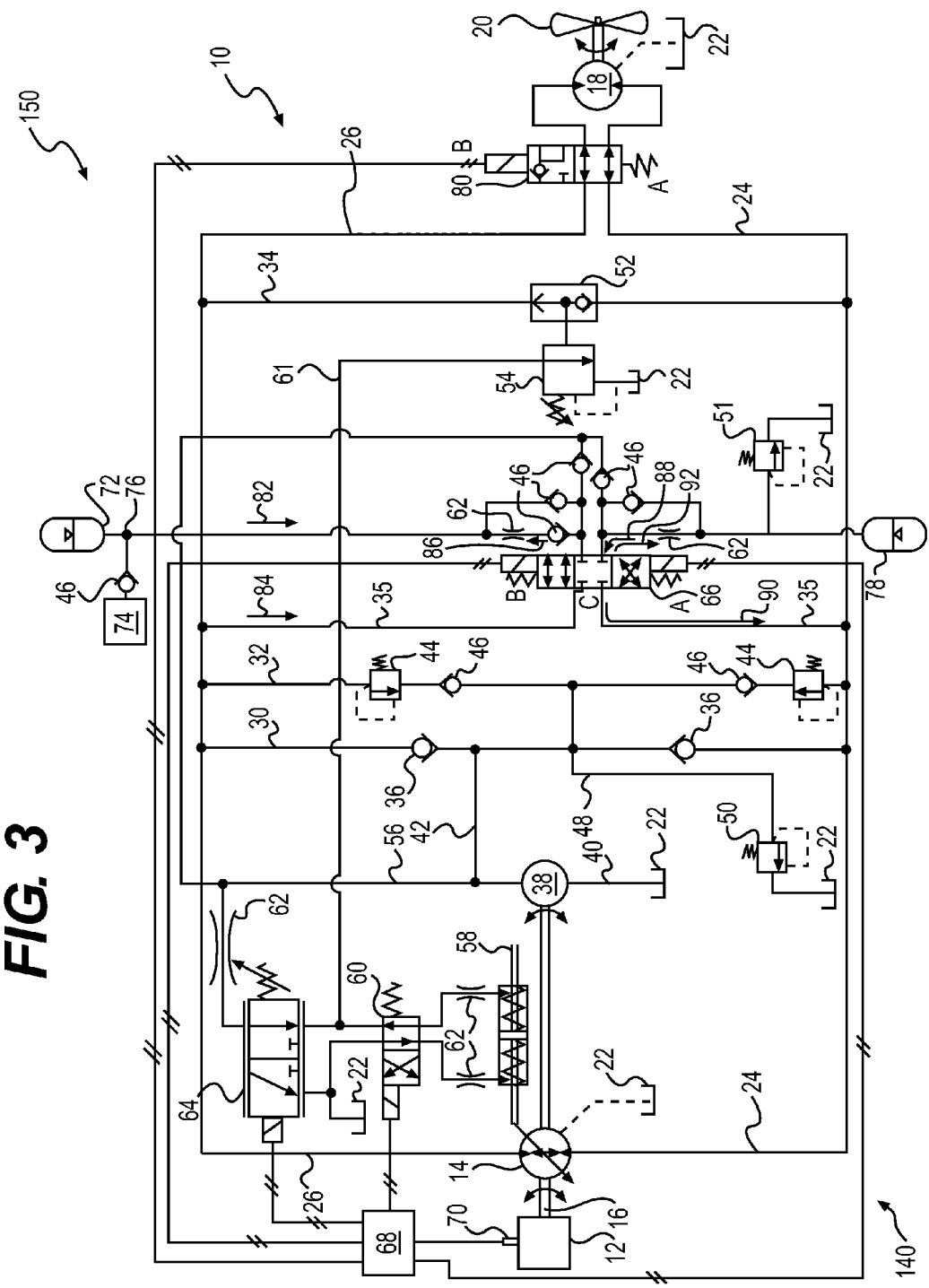
FIG. 3 is a schematic illustration of another exemplary hydraulic fluid system that may be used with the machine of FIG. 1.

As illustrated in FIG. 3, in an additional exemplary embodiment, the charge valve 66 may be movable between a plurality of different positions depending upon a desired flow path within the hydraulic fan circuit 10. For example, the charge valve 66 may be movable between a first position (illustrated as position A), a second position (illustrated as position B), and a third position (illustrated as position C). In the first position (position A) illustrated in FIG. 3, the charge valve 66 may direct fluid flowing from the first accumulator 72 to the return passage 24 via the charge passage 35. While disposed in the first position, the charge valve 66 may also direct fluid flowing from the supply passage 26 to the second accumulator 78 via the charge passage 35. Thus, the first position of the charge valve 66 may be, for example, a cross-flow position and/or configuration of the valve 66.

When the charge valve 66 is disposed in the second position (position B), on the other hand, the charge valve 66 may direct fluid flowing from the supply passage 26 to the first accumulator 72. While in the second position, the charge valve 66 may also direct fluid flowing from the second accumulator 78 to the return passage 24 via the charge passage 35. Thus, the second position of the charge valve 66 may comprise a parallel flow and/or flow through configuration of the valve 66.

In the third position (position C), the charge valve 66 may fluidly disconnect the first and second accumulators 72, 78 from the supply and return passages 26, 24. Thus, the third position of the charge valve 66 may comprise a flow-blocking position of the charge valve 66. The charge valve 66 may be biased toward the third position by any known means and, during normal operation of, for example, the engine system 140, the charge valve 66 illustrated in FIGS. 2 and 3 may be disposed in such a flow-blocking position.

While the charge valve 66 is in the flow-blocking position, for example, the first accumulator 72 may provide a pressurized flow of fluid to the open loop hydraulic circuit 74, and the second accumulator 78 may receive fluid from, for example, the charge pump 38. As illustrated in FIG. 3, one or more restrictive orifices 62, check valves 46, flow passages, and/or other flow control components may be fluidly connected to, for example, the charge valve 66 and/or the charge passage 35 to facilitate flow between the charge valve 66, the supply and return passages 26, 24, and the accumulators 72, 78. In addition, the fluid flow directions described above with regard to the charge valve 66 illustrated in FIG. 3 may be reversed and/or otherwise modified depending upon, for example, the direction of fluid flow within the supply and return passages 26, 24. For example, the flow directions and/or path described above with regard to the charge valve 66 may be applicable when the directional control valve 60 and/or other flow direction control components of the hydraulic fan circuit 10 control the flow direction associated with the supply and return passages 26, 24 in a forward direction. Such a forward direction of the hydraulic fan circuit 10 may be characterized by the directional control valve 60 directing fluid to flow from the primary pump 14 through the supply passage 26. In such a forward direction, fluid may also flow to the primary pump 14 via the return passage 24. It is understood that the directional control valve 60 may also control the flow direction associated with the supply and return passages 26, 24 in a reverse direction. Such a reverse direction may be characterized by the directional control valve 60 directing fluid to flow from the primary pump 14 through the return passage 24. Such a reverse direction may also be characterized by fluid flowing to the primary pump 14 through the supply passage 26.

In the forward direction, the motor 18 may control the fan 20 to provide a flow of air to, for example, one or more heat exchangers (not shown) or other cooling devices associated with the engine 12 to assist in convectively cooling the engine 12 and/or such cooling components. It is understood that one or more such cooling components may assist in reducing the temperature of coolant used to cool the engine 12. Thus, operating the fan 20 with fluid flowing in the forward direction may assist in directing air toward such cooling components to convectively reduce the temperature of such coolant. Alternatively, operating the fan 20 using fluid flowing in the reverse direction may reverse the direction of the fan 20 to assist in, for example, removing debris blocking the heat exchanger.

Controller 68 may embody a single or multiple microprocessors, field programmable gate arrays (FPGAs), digital signal processors (DSPs), etc. that include a means for controlling an operation of hydraulic fan circuit 10 in response to signals received from one or more sensors 70 associated with components of the hydraulic fan circuit 10 and/or the one or more open loop hydraulic circuits 74. Such sensors 70 may be configured to measure speed, rotation, pressure, temperature, fluid flow, and/or any other operating characteristic of the circuits 10, 74 and/or components thereof. Such sensors 70 may be, for example, speed sensors configured to measure the rotational speed of a shaft of the fan motor 18 and/or the engine 12. In further exemplary embodiments, such sensors 70 may be configured to measure a rotational speed of one or more components of the fan 20. In still further embodiments, such sensors 70 may be virtual sensors configured to determine fan speed based on, for example, a pressure of the fluid driving the motor 18. In still further exemplary embodiments, such sensors 70 may be configured to sense the pressure and/or fluid level within the accumulators 72, 78.

Numerous commercially available microprocessors can be configured to perform the functions of controller 68. It should be appreciated that controller 68 could readily embody a microprocessor separate from that controlling other engine- and/or machine-related functions, or that controller 68 could be integral with an engine or machine system microprocessor and be capable of controlling numerous engine and/or machine functions and modes of operation. If separate from the general engine or machine system microprocessor, controller 68 may communicate with these other microprocessors via datalinks or other methods. Various other known circuits may be associated with controller 68, including power supply circuitry, signal-conditioning circuitry, actuator driver circuitry (i.e., circuitry powering solenoids, motors, or piezo actuators), and communication circuitry.

Controller 68 may be in communication with directional control valve 60, pressure control valve 64, charge valve 66, sensor(s) 70, and recirculation valve 80 to control operations of hydraulic fan circuit 10 during a variety of operations. These operations will be described in more detail in the following section to further illustrate the disclosed concepts.

INDUSTRIAL APPLICABILITY

The hydraulic fan circuit 10 may be utilized with any engine system 140 where engine cooling, steering, and/or braking is desired. The closed loop hydraulic fan circuit 10 may, for example, assist in providing pressurized fluid to one or more of the closed loop hydraulic circuits 74 described herein to assist in machine steering, braking, and/or other like functions. Using the closed loop hydraulic fan circuit 10 to power and/or supply pressurized fluid to such open loop circuits 74 may eliminate the need for additional pumps and/or other fluid supply/fluid pressurization devices dedicated to such circuits 74. In addition, eliminating such additional pumps may simplify the design of the various circuits 10, 74, and may minimize the number of wear parts associated with such circuits 10, 74. As a result, the exemplary embodiments of the present disclosure may assist in improving the reliability and durability of these circuits 10, 74 and of the machine 100. Moreover, exemplary embodiments of the present disclosure may overcome known difficulties associated with effectively fluidly connecting closed loop hydraulic fan circuits 10 with one or more open loop circuits 74 of machines 10. These exemplary embodiments may overcome such difficulties by, for example, utilizing the first accumulator 72 to provide pressurized fluid to the open loop hydraulic circuits 74 while the pressure and/or fluid level within the first accumulator 72 is above a predetermined threshold value, and while the primary pump 14 directs a flow of fluid to motor 18. Once the pressure and/or fluid level within the first accumulator 72 reaches and/or dips below a predetermined threshold value, a portion of this fluid flow may be diverted from the motor 18 and/or primary pump 14 to the first accumulator 72 to assist in charging and/or refilling the first accumulator 72. While the first accumulator 72 is being charged, the second accumulator 78 may provide a flow of fluid to the motor 18 and/or primary pump 14 to make up for the diverted flow. This flow of makeup fluid from the second accumulator 78 may be required if for example, the combined demand of the motor 18 and the first accumulator 72 exceeds a capacity of the pilot pump 14.

In an exemplary embodiment, the engine 12 may drive primary pump 14 to rotate and pressurize fluid. The pressurized fluid may be discharged, in the forward direction, from primary pump 14 into supply passage 26, and may be directed into motor 18. As the pressurized fluid passes through motor 18, hydraulic power from the fluid may be converted to mechanical power used to rotate fan 20. As fan 20 rotates, a flow of air may be generated that facilitates cooling of engine 12. Fluid exiting motor 18, having been reduced in pressure, may be directed back to primary pump 14 via return passage 24 to repeat the cycle.

The fluid discharge direction and displacement of pump 14 may be regulated based on signals from engine sensor(s) 70, for example based on an engine speed signal, an engine temperature signal, an engine coolant temperature, and/or another similar signal. Controller 68 may receive these signals and reference a corresponding engine speed, engine temperature, or other similar parameter with one or more lookup maps stored in memory to determine a desired discharge direction and displacement setting of primary pump 14 and a corresponding rotation direction and speed of fan 20. Controller 68 may then generate appropriate commands to be sent to directional control valve 60 and pressure control valve 64 to affect corresponding adjustments to the displacement of primary pump 14.

The accumulators 72, 78 may be appropriately charged and/or otherwise filled at start-up of the machine 100, and/or during operation. The first accumulator 72 may be sized and/or otherwise configured to satisfy a fluid demand of the open loop hydraulic circuit 74 fluidly connected thereto. Over time, providing such fluid to the open loop hydraulic circuit 74 may cause a fluid and/or pressure level within the first accumulator 72 to decrease. Upon the first accumulator 72 reaching a minimum threshold pressure and/or a minimum threshold fluid level, the controller 68 may control the charge valve 66 to transition from the flow-blocking position (position A of FIG. 2 and position C of FIG. 3) to the flow-passing position (position B of FIGS. 2 and 3). Controlling the charge valve 66 in this way may cause pressurized fluid from the hydraulic fan circuit 10 to pass through the restrictive orifice 62 and into the first accumulator 72.

Upon and/or simultaneous with transitioning the charge valve 66 to the flow-passing position, the controller 68 may also increase, for example, the displacement, torque, flow, speed, and/or other operating characteristics of the primary pump 14 in order to meet the combined demand of the first accumulator 72 and the motor 18. If this combined demand exceeds the maximum output capacity of the primary pump 14, the second accumulator 78 may supply a flow of additional fluid via the charge valve 66, and such additional fluid may assist in satisfying this increased/combined demand. Thus, fluid may be directed from the hydraulic fan circuit 10 to the first accumulator 72 in response to the first accumulator 72 reaching a minimum threshold pressure and/or minimum threshold fluid level, and fluid may be directed from the second accumulator 78 to the motor 18 and/or pump 14 while the first accumulator 72 is being charged and/or otherwise refilled. To facilitate such fluid distribution, the primary pump 14 may be operated at a first output while the first accumulator 72 directs fluid to the open loop hydraulic circuit 74. However, the primary pump 14 may be operated at a second output, greater than the first output, in response to the first accumulator 72 reaching the minimum threshold pressure and/or fluid level and while directing fluid from the hydraulic fan circuit 10 to the first accumulator 72. Once the first accumulator 72 has been sufficiently refilled and/or otherwise charged, the charge valve 66 may transition from the flow-passing position back to the flow-blocking position.

In addition, with respect to the exemplary embodiment illustrated in FIG. 3, transitioning the charge valve 66 from the fluid-blocking position (position C) to the flow-passing position (position B) may direct fluid to flow from the supply passage 26, through the charge passage 35, in the direction of arrow 84. Such fluid may pass through the charge valve 66, and may continue on from the charge valve 66 to the first accumulator 72 in the direction of arrow 86. Likewise, while the charge valve 66 is in position B, fluid may flow from the second accumulator 78, toward the charge valve 66, in the direction of arrow 88. Such fluid may flow through the charge valve 66 to the return passage 24 in the direction of arrow 90

In such an exemplary embodiment, the charge valve 66, accumulators 72, 78, and/or other components of the hydraulic fan circuit 10 may be utilized to provide a pressurized flow of fluid to the primary pump 14, thereby assisting in powering the engine 12. For example, the charge valve 66 shown in FIG. 3 may be transitioned to the first position (position A) directing fluid to flow from the first accumulator 72 to the charge valve 66 in the direction of arrow 82. Such fluids may flow through the charge valve 66, operating in a cross-flow configuration, and may be directed to the return passage 24 in the direction of arrow 90. In this way, such fluid may cause the primary pump 14 to assist in driving the engine 12 while fluid is flowing in the forward direction. While the charge valve 66 is in the first position (position A), fluid from the supply passage 26 may be directed in the direction of arrow 84 to the charge valve 66. Such fluid may pass through the charge valve 66, and continue on to the second accumulator 78 in the direction of arrow 92. A remainder of the fluid flowing through the supply passage 26 may pass to a low pressure relief valve 51 to assist in driving the fan 20. In the exemplary embodiment illustrated in FIG. 3, it is understood that proper and/or desired operation of the charge valve 66 may depend upon, for example, whether pressurized fluid within the hydraulic fan circuit 10 is flowing in the forward direction or in the reverse direction. Although the embodiment of FIG. 3 discussed above has been described with regard to fluid flowing in the forward direction, it is understood that controlling such fluid to flow in the reverse direction may require and/or result in modification and/or reversal in the control of charge valve 66.

It will be apparent to those skilled in the art that various modifications and variations can be made to the disclosed hydraulic fan circuit. Other embodiments will be apparent to those skilled in the art from consideration of the specification and practice of the disclosed hydraulic fan circuit. It is intended that the specification and examples be considered as exemplary only, with a true scope being indicated by the following claims and their equivalents.

What is claimed is:

1. A hydraulic fluid system for a mobile machine, comprising:
   a closed loop hydraulic fan circuit, the hydraulic fan circuit including
       a primary pump,
       a motor fluidly connected to the primary pump,
       a fan driven by the motor
       a supply passage extending from the primary pump to the motor,
       a return passage extending from the motor to the primary pump, and
       a first accumulator selectively fluidly connected to at least one of the supply and return passages via a charge valve;
   at least one open loop hydraulic circuit fluidly connected to the first accumulator; and
   a directional control valve configured to control a flow direction associated with the supply and return passages, the directional control valve directing fluid to flow either from the primary pump through the supply passage in a forward direction, or from the primary pump through the return passage in a reverse direction,
       wherein the charge valve is moveable between a first position directing fluid flowing in the forward direction from the first accumulator to the return passage, and a second position directing fluid flowing in the forward direction from the supply passage to the first accumulator.

2. The hydraulic fluid system of claim 1, further comprising a restrictive orifice disposed between the charge valve and the first accumulator.

3. The hydraulic fluid system of claim 1, wherein the at least one open loop hydraulic circuit is fluidly connected to the first accumulator via a junction disposed between the charge valve and the first accumulator.

4. The hydraulic fluid system of claim 1, wherein the at least one open loop hydraulic circuit comprises a brake system of the mobile machine.

5. The hydraulic fluid system circuit of claim 1, wherein the at least one open loop hydraulic circuit comprises a steering system of the mobile machine.

6. The hydraulic fluid system of claim 1, further comprising a resolver fluidly connected to the supply and return passages, the resolver being configured to supply fluid to the charge valve.

7. The hydraulic fluid system of claim 1, further comprising a second accumulator fluidly connected to the supply and return passages, the second accumulator being configured to supply makeup fluid to the primary pump upon activation of the charge valve.

8. The hydraulic fluid system of claim 1, further comprising a second accumulator selectively fluidly connected to the supply and return passages via the charge valve.

9. A hydraulic fluid system of claim 8, wherein the charge valve is moveable to a third position fluidly disconnecting the first and second accumulators from the supply and return passages.

10. The hydraulic fluid system of claim 1, further comprising a recirculation valve fluidly connected to the supply and return passages, the recirculation valve configured to fluidly disconnect the motor from the supply and return passages.

11. A hydraulic fluid system for a mobile machine, comprising:
    a closed loop hydraulic fan circuit, the hydraulic fan circuit including
        a primary pump,
        a motor fluidly connected to the primary pump,
        a fan driven by the motor,
        a supply passage extending from the primary pump to the motor,
        a return passage extending from the motor to the primary pump,
        a first accumulator selectively fluidly connected to at least one of the supply and return passages via a charge valve, and
        a second accumulator fluidly connected to at least one of the supply and return passages, the second accumulator being configured to assist in providing a flow of makeup fluid to the primary pump while the charge valve directs fluid to the first accumulator; and
    an open loop hydraulic circuit fluidly connected to the first accumulator, the first accumulator being configured to supply a pressurized flow of fluid to the open loop hydraulic circuit.

12. The hydraulic fluid system of claim 11, wherein the second accumulator is configured to supply fluid to the primary pump upon the first accumulator reaching a minimum threshold pressure.

13. The hydraulic fluid system of claim 11, wherein the charge valve directs fluid to the first accumulator in response to the first accumulator reaching a minimum threshold pressure.

14. The hydraulic fluid system of claim 11, wherein charge valve is moveable between a first position directing fluid from the first accumulator to the return passage and fluid from the supply passage to the second accumulator, and a second position directing fluid from the supply passage to the first accumulator and fluid from the second accumulator to the return passage.

15. The hydraulic fluid system of claim 14, wherein the charge valve defines a third position fluidly disconnecting the first and second accumulators from the supply and return passages.

16. A method of supplying fluid to an open loop hydraulic circuit of a mobile machine, comprising:
    directing fluid from a first accumulator of a closed loop hydraulic fan circuit of the mobile machine to the open loop circuit, the closed loop hydraulic fan circuit including a motor, a fan driven by the motor, a primary pump fluidly connected to the motor, and a second accumulator fluidly connected to the fan;
    directing fluid from the closed loop hydraulic fan circuit to the first accumulator in response to the first accumulator reaching a minimum threshold pressure;
    directing fluid from the second accumulator to the primary pump while directing the fluid to the first accumulator; and
    providing a flow of makeup fluid to the primary pump using fluid from the second accumulator.

17. The method of claim 16, further comprising operating the primary pump of the closed loop hydraulic fan circuit at a first output while directing the fluid from the first accumulator to the open loop circuit, and operating the primary pump at a second output, greater than the first output, while directing the fluid from the closed loop hydraulic fan circuit to the first accumulator.

18. The method of claim 16, wherein directing the fluid from the closed loop hydraulic fan circuit comprises
- transitioning a charge valve fluidly connected to the first accumulator from a closed position to an open position, and
restricting passage of the fluid between the charge valve and the first actuator while the charge valve is in the open position.

* * * * *